US011394299B2

(12) United States Patent
Lazaro et al.

(10) Patent No.: US 11,394,299 B2
(45) Date of Patent: Jul. 19, 2022

(54) COMMON CONTROL FOR MULTIPLE POWER CONVERTER OPERATION MODES

(71) Applicant: TEXAS INSTRUMENTS INCORPORATED, Dallas, TX (US)

(72) Inventors: Orlando Lazaro, Dallas, TX (US); Reza Sharifi, Sunnyvale, CA (US); Benjamin Matthew McCue, Clinton, TN (US); Ryan Erik Lind, Knoxville, TN (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 16/566,815

(22) Filed: Sep. 10, 2019

(65) Prior Publication Data

US 2020/0127566 A1 Apr. 23, 2020

Related U.S. Application Data

(60) Provisional application No. 62/749,397, filed on Oct. 23, 2018.

(51) Int. Cl.
*H02M 3/158* (2006.01)
*H02M 1/00* (2006.01)

(52) U.S. Cl.
CPC ......... *H02M 3/158* (2013.01); *H02M 1/0061* (2013.01); *H02M 1/0003* (2021.05)

(58) Field of Classification Search
CPC . H02M 2001/0009; H02M 2001/0058; H02M 2001/0054; H02M 3/156; H02M 3/158; H02M 2001/0003; H02M 2003/1566; H02M 3/1588; H02M 3/335; H02M 1/08
See application file for complete search history.

(56) References Cited

U.S. PATENT DOCUMENTS

| 8,193,793 | B2* | 6/2012 | Kumagai | H02M 3/156 323/282 |
| 2006/0043953 | A1* | 3/2006 | Xu | H02M 3/156 323/282 |
| 2008/0224674 | A1* | 9/2008 | Hasegawa | H02M 3/158 323/271 |
| 2010/0052637 | A1* | 3/2010 | Lorentz | G01R 19/0092 323/282 |

(Continued)

*Primary Examiner* — Gustavo A Rosario-Benitez
(74) *Attorney, Agent, or Firm* — Mark A. Valetti; Charles A. Brill; Frank D. Cimino (57) ABSTRACT

Aspects of the disclosure provide for a circuit. In some examples, the circuit includes an amplifier having a first input configured to receive a signal representative of a condition related to a power converter, a second input configured to receive a reference signal, and an output, a PWM regulation circuit having an input coupled to the output of the amplifier, a first output configured to provide a first control signal for a high-side transistor of the power converter, and a second output configured to output a first control signal for a low-side transistor of the power converter, and a PFM regulation circuit having an input coupled to the output of the first amplifier, a first output configured to output a second control signal for the high-side transistor of the power converter, and a second output configured to output a second control signal for the low-side transistor of the power converter.

12 Claims, 5 Drawing Sheets

(56) References Cited

U.S. PATENT DOCUMENTS

| | | | | |
|---|---|---|---|---|
| 2010/0079127 A1* | 4/2010 | Grant | .................... | H02M 3/156 323/285 |
| 2012/0049821 A1* | 3/2012 | Hashiguchi | ........... | H02M 3/156 323/282 |
| 2012/0075891 A1* | 3/2012 | Zhang | .................... | H02M 1/08 363/21.18 |
| 2013/0294118 A1* | 11/2013 | So | ..................... | H02M 3/33507 363/21.16 |
| 2015/0028830 A1* | 1/2015 | Chen | .................... | H02M 3/156 323/271 |
| 2015/0061626 A1* | 3/2015 | Archibald | ............. | H02M 3/156 323/282 |
| 2015/0091544 A1* | 4/2015 | Jayaraj | .................. | H02M 3/156 323/284 |
| 2018/0019671 A1* | 1/2018 | Li | ........................... | F16K 1/523 |
| 2018/0115244 A1* | 4/2018 | Bolus | .................... | H02M 3/158 |
| 2020/0119641 A1* | 4/2020 | Liang | .................... | H02M 3/157 |

\* cited by examiner

COMMON CONTROL FOR MULTIPLE POWER CONVERTER OPERATION MODES

CROSS-REFERENCE TO RELATED APPLICATIONS

The present application claims priority to U.S. Provisional Patent Application No. 62/749,397, which was filed Oct. 23, 2018, is titled "Regularly Spaced PFM Technique with Common Outer Control Loop for PWM/PFM Operation," and is hereby incorporated herein by reference in its entirety.

BACKGROUND

Some battery chargers, or battery charger controllers, include multiple operation modes. These operation modes can include a continuous conduction mode (CCM) or a discontinuous conduction mode (DCM) and control can be exerted via pulse width modulation (PWM) signals or pulse frequency modulation (PFM) signals. Each operation mode and/or control signal may provide certain benefits over others in certain operational circumstances. For example, at light load conditions DCM operation under PFM control may provide more efficient operation, while at heavy load conditions CCM operation under PWM control may provide more efficient operation. Implementing both PWM and PFM control in the same battery charger can create challenges.

SUMMARY

Aspects of the present disclosure provide for a circuit. In at least some examples, the circuit includes a loop-selection circuit that includes a first amplifier having a first input terminal configured to receive a signal representative of a condition related to a power converter, a second input terminal configured to receive a reference signal, and an output terminal. The circuit also includes a pulse-width modulation (PWM) regulation circuit having an input terminal coupled to the output terminal of the first amplifier, a first output terminal configured to output a first control signal for a high-side transistor of the power converter, and a second output terminal configured to output a first control signal for a low-side transistor of the power converter. The circuit also includes a pulse-frequency modulation (PFM) regulation circuit having an input terminal coupled to the output of the first amplifier, a first output terminal configured to output a second control signal for the high-side transistor of the power converter, and a second output terminal configured to output a second control signal for the low-side transistor of the power converter.

Other aspects of the present disclosure provide for a circuit. In at least some examples, the circuit includes a voltage controlled oscillator (VCO) having an input terminal configured to receive a same voltage control signal as a PWM regulation circuit. The circuit further includes a pulse generation circuit having a first input terminal coupled to the output terminal of the VCO, a second input terminal, a third input terminal, a first output terminal configured to output a first control signal for a high-side transistor of a power converter, and a second output terminal configured to output a second control signal for a low-side transistor of the power converter. The circuit further includes a first comparator having a first input terminal configured to receive a signal representative of an inductor current of the power converter, a second input terminal configured to receive a peak-current reference signal, and an output terminal coupled to the second input of the pulse generation circuit. The circuit further includes a second comparator having a first input terminal configured to receive a zero-crossing current reference signal, a second input terminal configured to receive the signal representative of the inductor current of the power converter, and an output terminal coupled to the third input of the pulse generation circuit.

Other aspects of the present disclosure provide for a system. In at least some examples, the system includes a power converter comprising a high-side transistor, a low-side transistor, and configured to couple to an inductor. The system also includes a power converter controller that includes a loop-selection circuit having an input terminal configured to receive a feedback signal associated with the power converter and an output terminal, a PWM regulation circuit having an input terminal coupled to the output terminal of the loop-selection circuit, a first output terminal configured to output a first control signal for the high-side transistor, and a second output terminal configured to output a first control signal for the low-side transistor, and a PFM regulation circuit having an input terminal coupled to the output of the loop-selection circuit, a first output terminal configured to output a second control signal for the high-side transistor, and a second output terminal configured to output a second control signal for the low-side transistor.

BRIEF DESCRIPTION OF THE DRAWINGS

For a detailed description of various examples, reference will now be made to the accompanying drawings in which.

DETAILED DESCRIPTION

Several power delivery circuits include power converters that may operate under light load conditions. The power delivery circuits can include, among other possible implementations, battery chargers, power regulators, or both. These light load conditions may include a current draw of less than about half the peak-to-peak inductor current ripple, a current draw less than a predefined percentage (in some examples, about 20 percent) of a maximum providable output current, and/or an inductor ripple greater or less than a predefined threshold. It can be advantageous to operate a power converter according to discontinuous conduction mode (DCM) operation based on pulse frequency modulation (PFM) control (DCM/PFM control scheme) when the power converter is operating under light load conditions, for example, to increase efficiency of operation of the power converter. This advantageous operation is further discernible when the power converter is sourced by a limited power source, such as a battery with a finite amount of charge. For example, by increasing efficiency at least partially according to the teachings of the present disclosure, a greater amount of charge is transferred from the limited power source to a load rather than being lost due to inefficiencies. This greater transfer of charge, in some examples, provides for a longer runtime of a load receiving the charge from the limited power source or for a battery being charged based on the limited power source to charge to a greater level. The power converter, in one application, has a battery as a power source and a circuit or component other than a battery as a load such that the power converter regulates power from the battery to the load. In another application, the power converter has a battery as the load such that the power converter regulates power to the battery to charge the battery. Both of the above configurations are included within the scope of the present disclosure such that a particular type of load and a particular type of power source are not specified subsequently in this disclosure and do not limit the teachings of the present disclosure. For example, the teachings of the present disclosure are equally applicable to systems in which a battery is the load, a battery is the power source and some other component is the load, a battery is both the load and the power source, or the same battery is at some times the load and at other times the power source.

In at least some examples, this operation according to DCM and PFM creates instability in the power converter and/or a power delivery circuit that includes the power converter. The instability, in some examples, causes PFM pulses of the power converter to be compressed in time such that the power delivery circuit operates as a burst-mode device. For example, when operating according to the DCM/PFM control scheme and regulating according to an output voltage (VOUT), the power delivery circuit compares to a desired target or reference value (VREF). VREF is, in at least some examples, is a signal that indicates a regulation point for regulating VOUT (e.g., VREF is indicative of a desired VOUT, such as a scaled representation of VOUT). When VOUT falls below VREF, the power delivery circuit generates and outputs a PFM pulse to cause an increase in output current (IOUT) and a corresponding increase in VOUT. However, at least partially as a result of limitations in comparator gain, signal bandwidth limitations, etc., the DCM/PFM control scheme often results in multiple PFM pulses being generated and output prior to a control loop determining that VOUT has risen above VREF, causing over-regulation of VOUT. This output of multiple PFM bursts leading to over-regulation of VOUT is sometimes referred to as burst mode, causing the device to operate as a burst-mode device. In some situations, over-regulation of VOUT may introduce ripple into the VOUT at an output terminal. The ripple is, in some examples, at a frequency within a human-audible frequency range or spectrum, which causes the power converter to emit an audible buzzing sound while in operation. Some users may be sensitive to this audible buzzing sound. However, the trade-off to not creating the audible buzzing sound is not operating according to DCM and PFM to realize their efficiency gains, which may lead to increased power loss at light loads. Further, at least some power delivery circuits implement control according to a valley PFM scheme that is only able to regulate above a target value. Other power delivery circuits implement control according to a $V^2$ PFM control scheme that regulates according to an output voltage value (VOUT) but not according to other factors (e.g., such as temperature (TEMP), IOUT, etc.).

At least some aspects of the present disclosure provide for a circuit that implements both PWM and PFM regulation circuits based on a single control signal (V_CTRL) received in common between the PWM regulation circuit and the PFM regulation circuit. In some examples, an output current (e.g., such as an inductor current (IL)) is generated based on a PWM control signal output by the PWM regulation circuit or a PFM control signal output by the PFM regulation circuit. For example, based on a value of V_CTRL, a frequency at which an inductor of a power converter is energized to, and de-energized from, a fixed peak regulation current (I_PK) is determined. That frequency at least partially determines an average IL (<IL>) of the inductor when the power converter is controlled according to the PFM regulation circuit. Similarly, based on a value of V_CTRL, the PWM regulation circuit employs current-mode control to determine <IL>. Accordingly, the PWM regulation circuit and the PFM regulation circuit each implement a transfer function that translates a change in V_CTRL to a change in <IL>.

At least some aspects of the circuit of the present disclosure further provide for a PFM regulation circuit matching a V_CTRL/<IL> transfer function of the PWM regulation circuit when the PWM regulation circuit is a current-mode control circuit. This matching by the PFM regulation circuit provides for a substantially seamless transition by the circuit between operating based on PWM regulation and operating based on PFM regulation. In this context, the term "seamless" may be understood to mean that when a given value of V_CTRL corresponds to a given <IL> while under control of the PWM regulation circuit, the same value of V_CTRL corresponds to an approximately same <IL> while under control of the PFM regulation circuit. Without the seamless operation provided for herein a transition between control according to the PWM regulation circuit and a PFM regulation circuit could cause a sudden increase or decrease in IL, which can cause overshoot or undershoot, respectively, in VOUT. The sudden change in IL is sometimes caused at a time of transition from PWM control to PFM control, or vice versa, due to a mismatch in V_CTRL/<IL> transfer functions of the PWM regulation circuit and the PFM regulation circuit. This overshoot or undershoot can, in some examples, negatively affect operation of the power converter by causing VOUT to include ripple that momentarily causes VOUT not to be accurately regulated to VREF.

In at least some examples, the circuit implements one or more outer control loops that monitor one or more characteristics of the power converter, such as output current (IOUT), VOUT, input voltage (VIN), input current (IIN), TEMP, or any other desired or suitable characteristic. When a value of one of the monitored characteristics crosses a reference threshold, a corresponding change occurs in V_CTRL. The change in V_CTRL could be an increase in value of V_CTRL if the change in the monitored characteristic is a departure of a value of the monitored characteristic from within a desired range to outside the desired range. Alternatively, the change in V_CTRL could be a decrease in value of V_CTRL if the change in the monitored characteristic is a departure of the value of the monitored characteristic from outside the desired range to within the desired range.

The circuit further implements the PWM regulation circuit as an inner control loop and also implements the PFM regulation circuit as an inner control loop. In at least some examples, for a given change in value of V_CTRL, both the PWM regulation circuit and the PFM regulation circuit output control signals that cause a same change in value of IL (e.g., both the PWM regulation circuit and the PFM regulation circuit have a same V_CTRL to <IL> transfer function). In at least some examples, to match the V_CTRL to <IL> transfer function between the PWM regulation circuit and the PFM regulation circuit, the PFM regulation circuit includes a programmable current sink for sinking current from a signal path in the PFM regulation circuit to match the V_CTRL to <IL> transfer function between the PWM regulation circuit and the PFM regulation circuit.

As discussed above, in some circumstances operating according to DCM and PFM creates an audible buzzing noise in a power converter resulting from voltage ripple. To mitigate this, in at least some examples, the PFM regulation circuit includes a voltage-controlled oscillator (VCO) to generate a send pulse control signal (PULSE) for controlling the PFM regulation circuit to generate and output a pulse in the PFM control signal. In at least some examples, a frequency of PULSE increases with an increase in value of V_CTRL and the frequency of PULSE decreases with a decrease in value of V_CTRL. Further, in at least some examples a source of V_CTRL (e.g., such as a VOUT monitoring loop, a TEMP monitoring loop, etc.) does not restrict operation of the PWM regulation circuit or the PFM regulation circuit.

When operating as a burst-mode device, a node at which VOUT is present receives multiple pulses of charge, which for a given IL, reduces a frequency of operation of a circuit compared to sending one pulse at a time. If the frequency of operation is maintained above a human-audible frequency spectrum (e.g., greater than approximately 20 kilohertz (kHz)), a user, in most circumstances, will not hear an audible noise resulting from switching in the circuit. For some examples with sufficiently light loads, even a single pulse of PFM operation can have a frequency that falls within the human-audible frequency spectrum. To mitigate the creation of audible noise during PFM operation, at least some examples of the present disclosure introduce a dummy load (e.g., current-sink load) to improve no-load power loss and prevent the power converter from generating an audible noise resulting from the frequency of operation. This improves and/or creates an advantage or benefit to the user experience of a user using a device such as a smartphone, laptop computer, wearable device, etc. that includes a power converter and which would otherwise generate an audible noise during operation of the power converter in the absence of circuits, methods, or other teachings of, or substantially similar to, the present disclosure.

Figure 1:
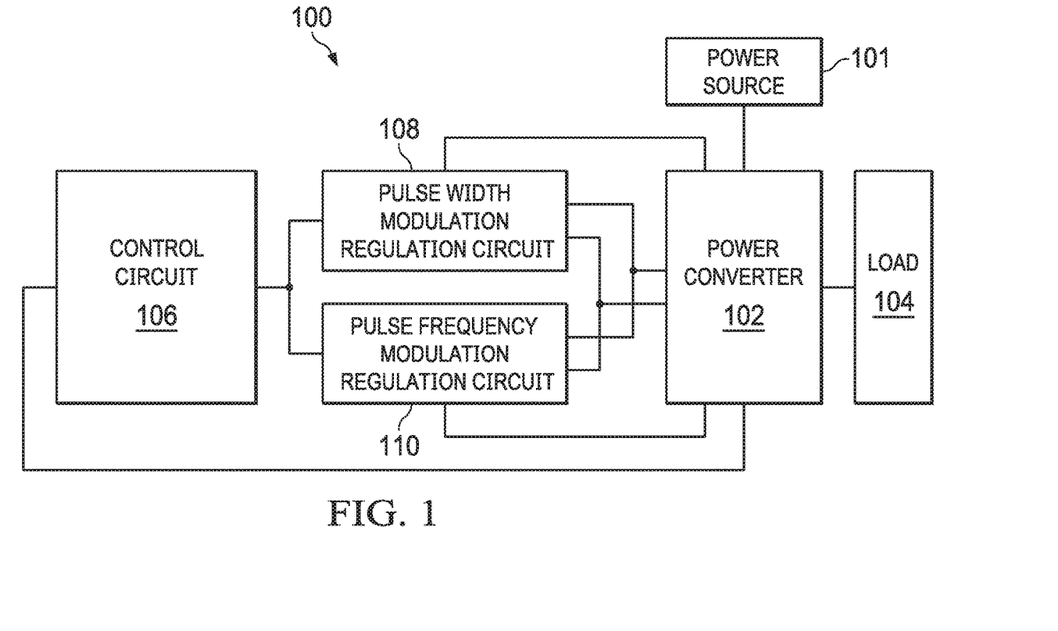
FIG. 1 shows a block diagram of an illustrative power delivery system in accordance with various examples.

Turning now to FIG. 1, a block diagram of an illustrative power delivery system 100 is shown. In at least some examples, the system 100 is representative of a power conversion circuit including both a power converter and a power converter controller. In some examples, the system 100 is implemented as a battery charger. In other examples, the system 100 is implemented as a power regulator for providing power from a power source 101 to a load 104, regardless of a type of the power source 101 or a type of the load 104 (e.g., regardless of whether the power source 101 is a battery or mains power and regardless of whether the load 104 is a battery or other component(s)). The system 100 includes, or is configured to couple to, a power converter 102 and the load 104. The system 100 further includes a control circuit 106, a PWM regulation circuit 108, and a PFM regulation circuit 110. In at least some examples, the system 100 further includes one or more components (not shown) for generating one or more feedback signals in the system 100, where the feedback signals are received by the control circuit 106 and compared to respective reference signals for generating V_CTRL.

In various examples, the control circuit 106 takes any form suitable for generating an output signal based on a monitored input signal. For example, in at least some implementations the control circuit 106 includes an amplifier (e.g., an error amplifier) having a first input configured to receive a signal representative of a condition related to another component of the system 100 (e.g., such as the power converter 120) and a second input that receives VREF. The amplifier then outputs V_CTRL for use regulating the power converter 102. V_CTRL is determined, for example, based on an amplification of a difference between the signal representative of a condition related to another component of the system 100 and VREF. For example, when the signal representative of the condition of the component of the system 100 does not meet a value of the reference signal, the comparator outputs a control signal for modifying operation of at least one component of the system 100. Modifying operation of the component of the system 100, in some examples, alters the value of the signal representative of the condition of the component of the system 100.

In other examples, the control circuit 106 includes one or more additional, or alternative, components not shown in FIG. 1. For example, the control circuit 106 may be a digital device with processing capability and digital-to-analog (DAC) functionality, a comparator, or any other suitable component. Generally, the control circuit 106 includes any suitable component for indicating whether an inductor of the power converter 102 should be energized or de-energized based on the signal representative of a condition related to another component of the system 100 and VREF. In at least some examples, the control circuit 106 may be referred to as a loop selection circuit. For example, a power converter controller may include a plurality of control loops such as a VOUT control loop, a TEMP control loop, an IOUT control loop, an IIN control loop, a VIN control loop, etc. Each of these control loops may include a respective amplifier in the control circuit 106 that compares a signal representative of a monitored condition (e.g., such as VOUT, TEMP, IOUT, IIN, VIN, etc.) to a respective reference, or desired, value. In this way the power converter controller controls a power converter to have one or more of the monitored conditions regulated to their respective reference, or desired, values. Accordingly, while the control circuit 106 is illustrated in FIG. 1 as a single circuit, in at least some examples a plurality of control circuits are coupled in parallel, or each have output terminals coupled to respective input terminals of an input selection device. In some implementations the input selection device may be a multiplexer with each respective control circuit monitoring a different characteristic or condition of the system 100 for use in generating V_CTRL, as discussed above.

In at least some examples, V_CTRL output by the control circuit 106 is received by both the PWM regulation circuit 108 and the PFM regulation circuit 110. The PWM regulation circuit 108 and the PFM regulation circuit 110 process V_CTRL to generate respective control signals for controlling the power converter 102. For example, the PWM regulation circuit 108 generates and outputs control signals HS_PWM and LS_PWM for controlling high-side and low-side transistors, respectively, of the power converter 102. Similarly, the PFM regulation circuit 110 generates and outputs control signals HS_PFM and LS_PFM for controlling the high-side and low-side transistors, respectively, of the power converter 102. In at least some examples, one or more input selection devices (not shown) such as multiplexers, digital logic, or any other suitable selection circuitry select signals among HS_PWM, LS_PWM, HS_PFM, and LS_PFM for controlling the power converter 102. The input selection devices may select a received input for output based on whether control of the power converter 102 is to be performed according to PWM regulation or PFM regulation.

In at least some examples, both the PWM regulation circuit 108 and the PFM regulation circuit 110 receive one or more signals from the power converter 102, such as at least a signal representative of IL, for use in generating HS_PWM and LS_PWM, or HS_PFM and LS_PFM, respectively.

In some examples, the PWM regulation circuit 108 operates substantially similar to the power converter 102, for example, based on a comparison of V_CTRL (or a signal based on V_CTRL) to a reference signal. The PFM regulation circuit 110 operates by receiving V_CTRL and IL and, based on values of V_CTRL and IL, generating HS_PFM and LS_PFM. For example, based on V_CTRL the PFM regulation circuit 110 generates PULSE (e.g., as a VCO output). Based on PULSE, the PFM regulation circuit 110 further generates HS_PFM and LS_PFM, as will be discussed in greater detail herein. In at least some examples, utilization of the PFM regulation circuit 110 when the load 104 is classified as a light load increases efficiency of the system 100. In some implementations, the increased efficiency reduces power loss associated with operation of the system 100 in switching power from the power source 101 to the load 104. The reduced power loss increases, in some examples, a period of time that a limited power source can supply power to the system 100 when compared to a period of time that the limited power source could otherwise supply power to the system 100 without use of the PFM regulation circuit 110. The system 100 implements the PFM regulation circuit 110, in at least some examples, with an architecture that includes a VCO, mitigating the burst-mode induced audible sound resulting from VOUT ripple, as discussed above.

Figure 2:
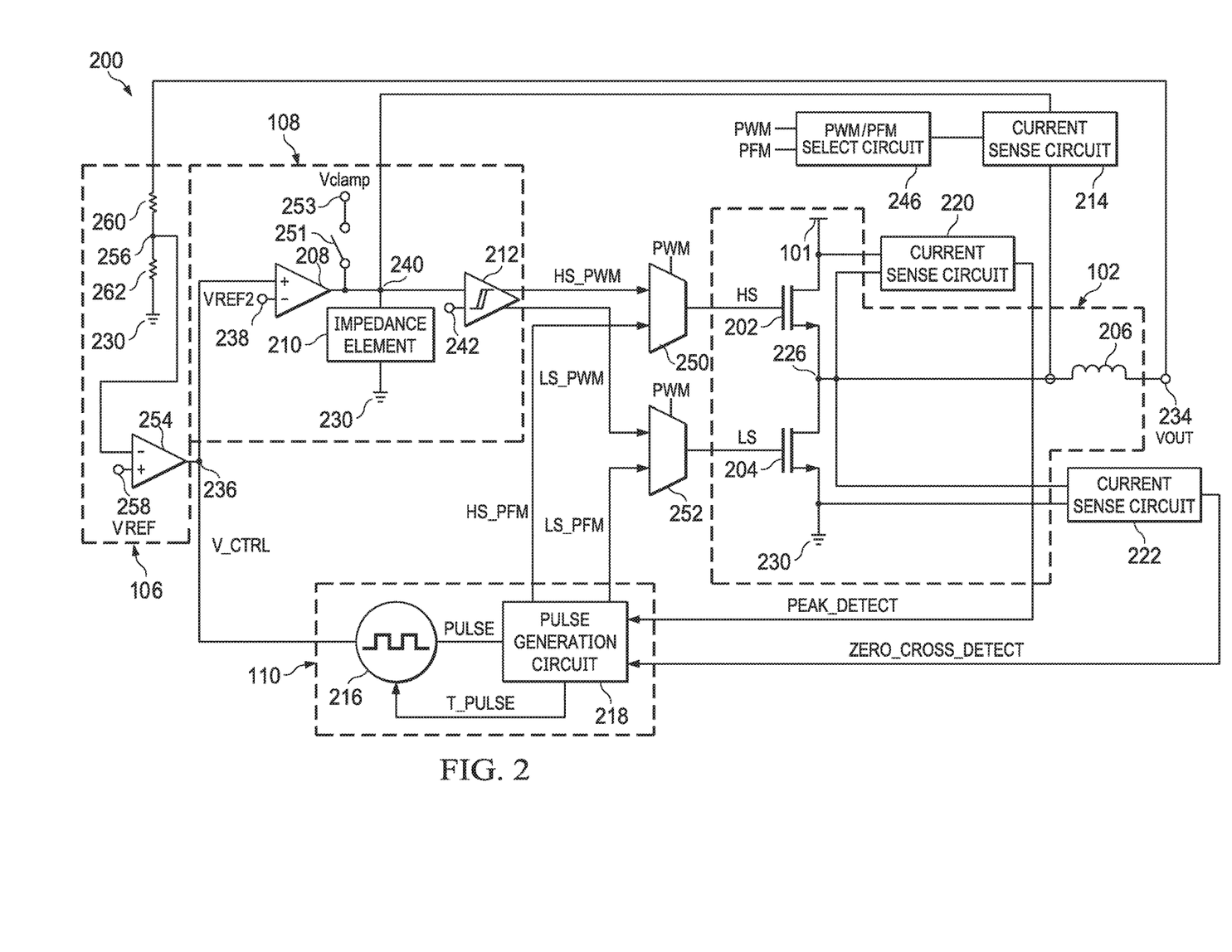
FIG. 2 shows a schematic diagram of an illustrative power delivery circuit in accordance with various examples.

Turning now to FIG. 2, a schematic diagram of an illustrative power delivery circuit 200 is shown. In at least some examples, the circuit 200 is a component of a power conversion circuit including both a power converter and a power converter controller. In some examples, the circuit 200 is a component of a battery charger. At least some aspects of the circuit 200 correspond to aspects of the system 100, and reference to like numerals is made to signify this correspondence.

The circuit 200 includes the power converter 102, the control circuit 106, the PWM regulation circuit 108, and the PFM regulation circuit 110. In some examples, at least some of the power converter 102, the control circuit 106, the PWM regulation circuit 108, and/or the PFM regulation circuit 110 are implemented as standalone components that are then coupled together to provide the architecture and/or functionality of the circuit 200. In other examples, at least some of the control circuit 106, the PWM regulation circuit 108, and the PFM regulation circuit 110 may be implemented together in a single integrated circuit package or on a single semiconductor die and the power converter 102 may be coupled to this single integrated circuit package or semiconductor die. Similarly, at least some of the control circuit 106, the PWM regulation circuit 108, and the PFM regulation circuit 110 may be implemented separately and coupled together to provide the architecture and/or functionality of the circuit 200 in substantially the same manner.

In at least some examples, the power converter 102 includes a high-side field-effect transistor (FET) 202 and a low-side FET 204. The power converter 102 further includes, or is configured to couple at an external facing terminal of the circuit 200 to, an inductor 206. The control circuit 106 includes, in some examples, an amplifier 254 having a first input terminal (e.g., a non-inverting input terminal) coupled to a node 256, a second input terminal (e.g., an inverting input terminal) coupled to a node 258, and an output terminal coupled to the node 236. The control circuit 106 further includes, in some examples, a voltage divider or other signal magnitude scaling circuitry configured to scale a value of a received circuit. For example, in one implementation the control circuit 106 includes a resistor 260 and a resistor 262 that together form a voltage divider coupled between the node 234 and the ground node 230. The amplifier 254 couples to the voltage divider at the node 256 which is a midpoint of the voltage divider. In this way, VOUT, as present at the node 234, is scaled according to a ratio of the values of resistance of the resistor 262 to the resistor 260 and the scaled representation of VOUT is provided to the first input terminal of the amplifier 254. Additionally, the amplifier 254 receives VREF at the node 258. The amplifier 254 amplifies a difference between the scaled representation of VOUT and VREF and outputs that result as V_CTRL.

In at least some examples, the control circuit 106 as shown in FIG. 2 is referred to as a VOUT control loop (e.g., the control circuit 106 generates V_CTRL based on VOUT). While only a VOUT control loop is shown as an exemplary implementation of the control circuit 106, the control circuit 106 may take various other forms as discussed herein. For example, the control loop 106 may instead be as a TEMP control loop, a VIN control loop, an IOUT control loop, an IIN control loop, etc. Each of these control loops is substantially similar in function to the VOUT control loop illustrated in FIG. 2, but having a different signal source than the node 234 and, in some examples, a different reference voltage than VREF. Additionally, as discussed above with respect to FIG. 1, in at least some examples a plurality of additional control circuits (not shown) are coupled in parallel with the control circuit 106. An output selected as V_CTRL from among the outputs of the controls circuits is selected, in some examples, by an input selection device such as a multiplexer (not shown).

The PWM regulation circuit 108 includes, in some examples, an amplifier 208 (e.g., a transconductance amplifier that receives and amplifies a differential input voltage to produce an output current), an impedance element 210, and a comparator 212. In at least some implementations, the PWM regulation circuit 108 further includes, or is configured to couple to, a current sense circuit 214 that generates and/or provides a signal representative of a current of the inductor 206 (e.g., IL).

The PFM regulation circuit 110 includes, in some examples, a VCO 216 and a pulse generation circuit 218. In at least some implementations, the PFM regulation circuit 110 further includes, or is configured to couple to, a current sense circuit 220 that generates and/or provides a signal (PEAK_DETECT) that indicates when IL has risen to reach I_PK and a current sense circuit 222 that generates and/or provides a signal (ZERO_CROSS_DETECT) that indicates when IL has fallen to approximately zero. For example, an implementation of the current sense circuit 220 may include one or more components for detecting a current flowing through the power converter 102 and a comparator for comparing a signal representative of that detected current to I_PK. Similarly, an implementation of the current sense circuit 222 may include one or more components for detecting the flowing through the power converter 102 and a comparator for comparing a signal representative of that detected current to zero or a ground potential. In at least some examples, the circuit 200 further includes a multiplexer 250 and a multiplexer 252.

In at least some examples, the high-side FET 202 has a drain terminal configured to couple to and receive power from a power source 101, a source terminal coupled to a node 226, and a gate terminal coupled to an output terminal of the multiplexer 250, where the high-side FET 202 is configured to receive a control signal HS from the multiplexer 250. The low-side FET 204 has a drain terminal coupled to the node 226, a source terminal coupled to a ground node 230, and a gate terminal coupled to an output terminal of the multiplexer 252, where the low-side FET 204 is configured to receive a control signal LS from the multiplexer 252. The inductor 206 is configured to couple between the node 226 and a node 234. The amplifier 208 has a first input terminal coupled to a node 236 and a second input terminal coupled to a node 238. An output terminal of the amplifier 208 is coupled to a node 240, the impedance element 210 is coupled between the node 240 and the ground node 230, a first input terminal of the comparator 212 is coupled to the node 240, and a second input terminal of the comparator 212 is coupled to a node 242. In at least some implementations, a ramp signal (e.g., a saw-tooth slope compensation signal) is received by the comparator 212 at the node 242 for comparison to a signal generated based at least partially on V_CTRL. A first output terminal of the comparator 212 is coupled, or configured to couple, to a first input terminal of the multiplexer 250 and a second output terminal of the comparator 212 is coupled, or configured to couple, to a first input terminal of the multiplexer 252. The current sense circuit 214 has an output terminal coupled to the node 240 and an input terminal configured to couple to the power converter 102 to enable the current sense circuit 214 to determine a signal representative of IL. In at least some examples, a switch 251 couples a node 253 to the node 240. The switch 251, in some examples, is controlled by a signal PFM, as discussed elsewhere herein, and selectively couples the node 240 to the node 253.

The VCO 216 has an input terminal coupled to the node 236 and an output terminal coupled to a first input terminal of the pulse generation circuit 218. In at least some examples, the VCO 216 includes one or more additional input terminals not shown in FIG. 2, such as terminals that receive one or more reference signals, one or more switch control signals, etc. The pulse generation circuit 218 has a first output terminal coupled, or configured to couple, to a second input terminal of the multiplexer 250 and a second output terminal coupled, or configured to couple, to a second input terminal of the multiplexer 252. The current sense circuit 220 has a first input terminal coupled to the power source 101, a second input terminal coupled to the node 226, and an output terminal coupled to the pulse generation circuit 218. The current sense circuit 222 has a first input terminal coupled to the node 226, a second input terminal coupled to the ground node 230, and an output terminal coupled to the pulse generation circuit 218. The pulse generation circuit 218 further has a third output terminal coupled to an input terminal of the VCO 216.

In at least some examples, as described above, both the PWM regulation circuit 108 and the PFM regulation circuit 110 are coupled to the node 236. V_CTRL is received at the node 236 for controlling the PWM regulation circuit 108 and/or the PFM regulation circuit 110 to generate and output control signals to the high-side FET 202 and/or the low-side FET 204. Accordingly, in at least some examples, the PFM regulation circuit 110 is configured to have a same V_CTRL to <IL> transfer function as the PWM regulation circuit 108, as discussed in greater detail elsewhere herein. In at least some examples, the PWM regulation circuit 108 utilizes current-mode feedback to cause the inductor 206 to generate <IL> according to both V_CTRL and the feedback. Multiple current-mode PWM regulation circuit architectures and/or operational schemes are possible, and any suitable circuit and/or scheme to provide the functionality described herein is suitable for the PWM regulation circuit 108, the scope of which is not limited herein.

The amplifier 208 drives current into the node 240 based on a differential amplification of V_CTRL and a direct-current (DC) bias signal received at the node 238 and denoted in FIG. 2 as VREF2. The DC bias signal has any suitable value selected, in at least some examples, to provide sufficient headroom for operation of the amplifier 208. In at least one implementation, the node 240 is an error node at which a voltage increases when the sensed current (e.g., as output by the current sense circuit 214) is lower than a desired <IL>. Conversely, the voltage present at the node 240 decreases when <IL> is higher than the desired <IL>. <IL> is linear with V_CTRL such that V_CTRL can be said to "set" the desired <IL> for the PWM regulation circuit 108 (e.g., when V_CTRL increases in value so does the desired <IL> and vice versa). The comparator 212 compares the node 240 with the node 242 to generate HS_PWM and LS_PWM, where HS_PWM and LS_PWM are logical opposites. The duty-cycle of HS_PWM increases when V_CTRL increases in value and decreases when V_CTRL decreases in value. Similarly, an increase or decrease in duty-cycle causes <IL> to increase or decrease, respectively. Because the circuit 200 includes negative feedback, an increase in duty-cycle of HS_PWM increases <IL>, which is fed back through the current sense circuit 214 to the node 240 to decrease the duty-cycle of HS_PWM. This causes a value of a voltage present at the node 240 to fall to the desired <IL>, as dictated by V_CTRL, to equal the sensed current as provided by the current sense circuit 214.

The impedance element 210 and the saw tooth waveform received at the node 242 compensate (e.g., make stable) the current control loop formed of a critical path passing from the node 240 through the circuit 200 to the node 226 and back to the node 240 through the current sense circuit 214. For example, the saw tooth waveform received at the node 242 reduces a gain of the current control loop to prevent a crossover frequency (e.g., frequency at which a gain of the current control loop is equal to one) of the current control loop from exceeding a switching frequency of the power converter 102. In at least some examples, the crossover frequency of the current control loop exceeding the switching frequency of the power converter 102 creates instability in the circuit 200 and preventing the crossover frequency of the current control loop from exceeding the switching frequency of the power converter 102 prevents this instability. Because of this compensation and feedback provided by the current sense circuit 214, a transfer function of the PWM regulation circuit 108 from V_CTRL to <IL> is linear as long as the current sense circuit 214 is linear in operation.

Based on the received V_CTRL, the VCO 216 generates PULSE as a periodic signal, as discussed in greater detail below with respect to FIG. 4. Subsequently, the pulse generation circuit 218 generates HS_PFM and LS_PFM based on PULSE received from the VCO 216, as is discussed in greater detail below with respect FIG. 5. PULSE is, in some examples, referred to as a regularly-spaced signal such that PULSE maintains a same period for a given value of V_CTRL without including burst mode characteristics or pulses, as discussed above. In at least some examples, PULSE has a frequency of f_SW-PFM, which is proportional to <IL>. A ratio of f_SW-PFM to V_CTRL is determined according to a coefficient (K_VCO) of the VCO 216. Thus, by controlling K_VCO, the V_CTRL to <IL> transfer function of the PFM regulation circuit 110 is adjustable to approximately equal the V_CTRL to <IL> transfer function of the PWM regulation circuit 108. When the V_CTRL to <IL> transfer function of the PFM regulation circuit 110 approximately equals the V_CTRL to <IL> transfer function of the PWM regulation circuit 108, outer loop compensation (e.g., compensation for a loop that generates V_CTRL, such as the control circuit 106 of the system 100 of FIG. 1) is the same for both the PFM regulation circuit 110 and the PWM regulation circuit 108. By enabling use of the same outer loop compensation for both the PFM regulation circuit 110 and the PWM regulation circuit 108, stability in operation of the PFM regulation circuit 110 is provided when the outer loop that generates V_CTRL has been properly compensated for operation of the PWM regulation circuit 108. In at least some examples, not using the same outer loop and/or outer loop compensation for both the PFM regulation circuit 110 and the PWM regulation circuit 108 prevent regulating operation of the power converter 102 according to a criteria other than VOUT. Moreover, in at least some examples, not using the same outer loop compensation for both the PFM regulation circuit 110 and the PWM regulation circuit 108 may cause instability in the outer loop and, in some operating circumstances, cause the undesirable burst-mode operation discussed herein.

Figure 3:
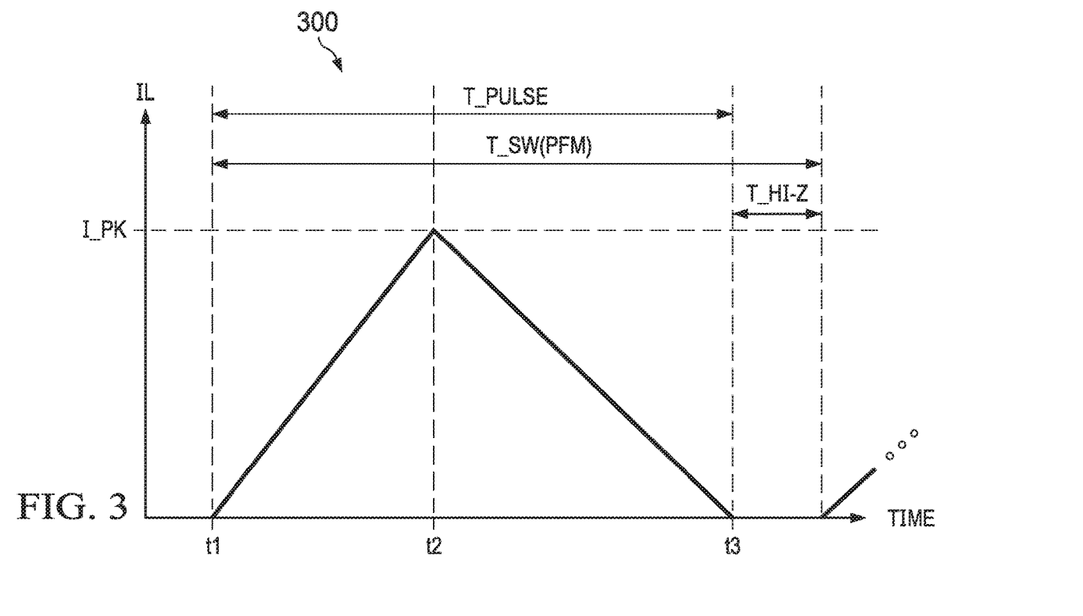
FIG. 3 shows a diagram of an illustrative inductor current signal waveform in accordance with various examples.

In at least some examples, the pulse generation circuit 218 generates HS_PFM and LS_PFM to cause the power converter 102 to generate fixed-peak current pulses having a peak of I_PK. For example, a period of time that the inductor 206 is energizing according to HS_PFM or de-energizing according to LS_PFM is defined as T_PULSE, such that T_PULSE is asserted when IL is non-zero. For example, turning for a moment to FIG. 3, a diagram 300 of an illustrative inductor current signal waveform is shown. In at least one example, the diagram 300 is illustrative of IL. As shown in FIG. 3, at a time t1, IL begins to increase. IL beginning to increase, in at least some examples, corresponds to a signal being asserted at the gate terminal of the high-side FET 202 and a signal being de-asserted at the gate terminal of the low-side FET 204 to cause an inductor corresponding to IL to begin to energize. As further shown by FIG. 3, at a time t2 at which a value of IL has risen to approximately equal I_PK, IL begins to decrease. IL begins to decrease, in at least some examples, corresponding to a signal being de-asserted at the gate terminal of the high-side FET 202 and a signal being asserted at the gate terminal of the low-side FET 204 to cause the inductor corresponding to IL to begin to de-energize. As further shown by FIG. 3, at a time t3 at which a value of IL has fallen to approximately zero, de-energizing of the inductor corresponding to IL ends (e.g., such that the inductor corresponding to IL is controlled according to DCM operation). De-energizing of the inductor corresponding to IL ends, in at least some examples, corresponding to a signal being de-asserted at the gate terminal of the high-side FET 202 and a signal being de-asserted at the gate terminal of the low-side FET 204.

As further shown in FIG. 3, a period of time of the IL pulse is shown as T_PULSE, a period of time (e.g., such as a period of high impedance) between pulses of IL is shown as T_HI-Z, and a switching period is shown as T_SW(PFM). A total energy of the IL pulse illustrated in FIG. 3 is Q_PULSE, where Q_PULSE is approximately equal to one-half of the result of I_PK multiplied by T_PULSE and <IL> is approximately equal to Q_PULSE divided by T_SW (PFM). Additionally, <IL> can be determined according to the following equation 1.

$$\langle IL \rangle = \frac{I\_PK}{2} * \frac{T\_PULSE}{T\_SW(PFM)} \quad \text{equation 1}$$

Returning to FIG. 2, in at least some examples the multiplexer 250 and the multiplexer 252 select signals for output as HS and LS, respectively. The multiplexer 250 and the multiplexer 252 each receive a select signal that selects a received input signal for output. In at least some implementations, the multiplexer 250 receives PWM at a select signal input terminal of the multiplexer 250 and outputs HS_PWM or HS_PFM according to a value of PWM. For example, when PWM is asserted, the multiplexer 250 outputs HS_PWM and when PWM is de-asserted, the multiplexer 250 outputs HS_PFM. Similarly, in some implementations the multiplexer 252 receives PWM at a select signal input terminal of the multiplexer 252 and outputs LS_PWM or LS_PFM according to the value of PWM. For example, when PWM is asserted, the multiplexer 252 outputs LS_PWM and when PWM is de-asserted, the multiplexer 252 outputs LS_PFM. In at least some examples, PWM is received by the multiplexer 250 and the multiplexer 252 from any suitable source within the circuit 200 or external to the circuit 200 and coupled to the circuit 200.

In at least some examples, PWM and PFM respectively indicate whether the circuit is operating according to PWM regulation or PFM regulation. For example, at a time of startup of the circuit 200, both PFM and PWM are asserted to hold the circuit 200 in a default or startup condition. After a predefined period of time sufficient to allow power to supply power to propagate through the circuit 200, one of PFM or PWM is de-asserted and the circuit 200 proceeds to operate in a regulation mode determined according to the still asserted signal. In some examples, after expiration of the predefined period of time PWM is de-asserted and the circuit 200 operates according to PFM regulation under control of the PFM regulation circuit 110. In other examples, after expiration of the predefined period of time PFM is de-asserted and the circuit 200 operates according to PWM regulation under control of the PWM regulation circuit 108. After this startup sequence, in at least some examples, PWM is determined at least partially according to <IL>. For example, when <IL> is greater in value than I_PK/2, PWM is asserted (and correspondingly PFM is de-asserted) and the circuit 200 is operating according to a PWM mode of operation. Conversely, in at least some examples when <IL> is less than I_PK/2, PWM is de-asserted (and correspondingly PFM is asserted) and the circuit 200 is operating according to a PFM mode of operation. In some examples, PWM is instead de-asserted (and optionally a signal PFM is asserted) when <IL> is less than I_PK/2 minus a hysteresis value to prevent rapid toggling between the PWM and PFM modes of operation.

To generate PWM and PFM, in at least some examples the circuit 200 includes, or is configured to couple to, a PWM/PFM select circuit 246. In at least some implementations, the PWM/PFM select circuit 246 receives a signal representative of IL from the current sense circuit 214 and outputs signals PWM and PFM having values determined as described above. In some examples, the PWM/PFM select circuit 246 includes one or more analog and/or digital components configured to determine whether IL is greater than I_PK/2 or less than I_PK/2, or I_PK/2 minus a hysteresis value. In other examples, the PWM/PFM select circuit 246 includes a processor configured to receive a signal representative of IL from the current sense circuit 214 and determine whether IL is greater than I_PK/2 or less than I_PK/2, or I_PK/2 minus a hysteresis value.

In some implementations, when PFM is asserted the switch 251 is closed, electrically coupling the node 240 to the node 253. In at least some examples, a clamping voltage (Vclamp) is received at the node 253. Vclamp, in some examples, is a signal predictive of a duty cycle of the power converter 102. For example, in some implementations Vclamp is an output of a comparator (not shown) that compares a signal representative of VOUT to a signal representative of VIN to estimate or predict a duty cycle of the power converter 102. In other implementations Vclamp is representative of any suitable value and/or is determined and provided by any suitable component(s). By coupling the node 240 to the node 253, the node 240 is held at Vclamp to clamp or maintain the node 240 at, or near, an operational point for PWM regulation while operating according to PFM regulation. Clamping the node 240 to Vclamp, in at least some examples, at least partially aids in the seamless transition between PWM and PFM regulation modes, as discussed herein.

The current sense circuit 220 is any circuit suitable for monitoring the power converter 102 and generating PEAK_DETECT indicating that IL has reached I_PK. In at least some examples, the current sense circuit 220 includes a sense FET (not shown), a bias current source (not shown), and a comparator (not shown) for detecting IL and generating PEAK_DETECT. The current sense circuit 222 is any circuit suitable for monitoring the power converter 102 and generating ZERO_CROSS_DETECT indicating that IL has reached a zero crossing, or has a value of approximately zero. In at least some examples, the current sense circuit 222 includes a sense FET (not shown), a bias current source (not shown), and a comparator (not shown) for detecting IL and generating ZERO_CROSS_DETECT.

Figure 4:
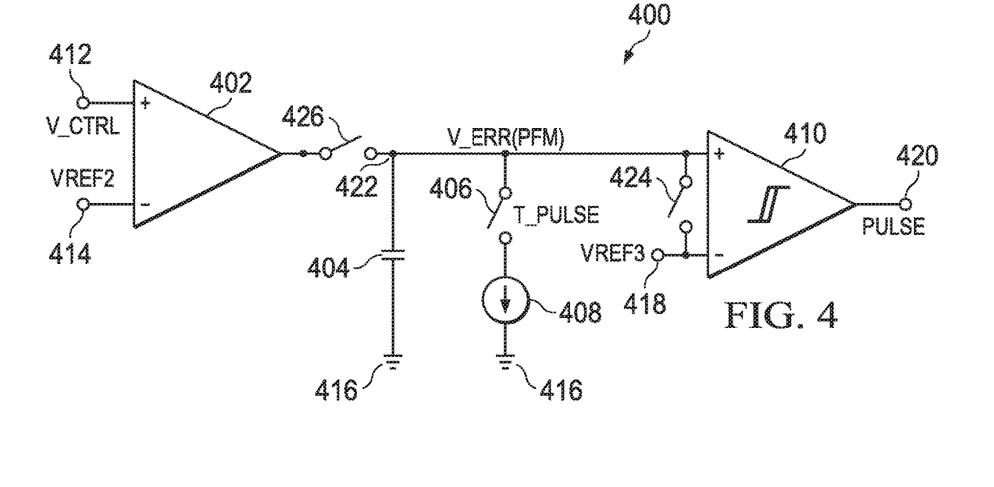
FIG. 4 shows a schematic diagram of an illustrative oscillator circuit in accordance with various examples.

Turning now to FIG. 4, a schematic diagram of an illustrative oscillator circuit 400 is shown. In at least some examples, the circuit 400 is an illustrative implementation of a VCO, such as the VCO 216 of the circuit 200 of FIG. 2. In at least one example architecture, the circuit 400 includes an amplifier 402, a capacitor 404, a switch 406, a current source 408, and a comparator 410. The amplifier 402 is, in some examples, a transconductance amplifier for which a differential input voltage produces an output current.

In at least one example, the amplifier 402 has a first input terminal (e.g., a non-inverting input) coupled to a node 412, a second input terminal (e.g., an inverting input) coupled to a node 414, and an output terminal coupled to a node 422. The capacitor 404 is coupled between the node 422 and a ground node 416. The switch 406 has a first terminal coupled to the node 422 and a second terminal coupled to a first terminal of the current source 408, which has a second terminal coupled to the ground node 416. The comparator 410 has a first input terminal (e.g., a non-inverting input) coupled to the node 422, a second input terminal (e.g., an inverting input) coupled to a node 418, and an output terminal coupled to a node 420. Optionally, in some examples, a switch 424 is coupled between the first input terminal and the second input terminal of the comparator 410. In at least some examples, a DC bias signal is received at the node 418 and is noted in FIG. 4 as VREF3. The DC bias signal has any suitable value selected, in at least some examples, to provide sufficient headroom for operation of the comparator 410.

In an example of operation of the circuit 400, V_CTRL is received at the node 412 and a DC bias signal is received at the node 414 as is denoted in FIG. 4 as VREF2. Accordingly, in at least some examples the node 412 is coupled to the node 236 of FIG. 2 such that the node 412 is also coupled to a node of a PWM regulation circuit (such as the PWM regulation circuit 108 of FIG. 2) through the node 236. Further, in at least some examples, the DC bias signal is the same signal as received at node 238 of FIG. 2 such that the node 414 and the node 238 are coupled together in some implementations in which the circuit 400 is implemented as the PFM regulation circuit 108 of FIG. 2. In other examples, the DC bias signal received at the node 414 has approximately a same value as the DC bias signal received at the node 238 while being a separate physical signal. In at least some examples, the DC bias signal received at the node 238 and the DC bias signal received at the node 414 are approximately equal in value to cause the amplifier 208 of FIG. 2 and the amplifier 402 to respond in a same manner (e.g., have substantially a same output value) for a given V_CTRL. The amplifier 402 amplifies a difference between the signals received at the node 412 and the node 414 and outputs a current I_vco. I_vco is approximately equal to V_CTRL multiplied by Gm(PFM), where Gm(PFM) is a transconductance of the amplifier 402 and relates output current to input voltage of the amplifier 402. Based on T_PULSE, described above with reference to FIGS. 2 and 3, the switch 406 selectively couples and decouples the current source 408 from the node 422. For example, during the period of T_PULSE, the switch 406 is closed, coupling the current source 408 to the node 422. During the period of T_HI-Z, described above with reference to FIG. 3, the switch 406 is open, de-coupling the current source 408 from the node 422.

When the current source 408 is coupled to the node 422, the current source 408 sinks an amount of current I_SINK from the node 422. When the circuit 400 is implemented as the VCO 216, controlling a value of I_SINK enables approximate matching of the V_CTRL to <IL> transfer function of the PFM regulation circuit 110 to the V_CTRL to <IL> transfer function of the PWM regulation circuit 108, providing the advantageous operation discussed throughout the present disclosure. For example, K_VCO of the circuit 400 is determined according to the below equation 2. Accordingly, when the circuit 400 is implemented as the VCO 216, the V_CTRL to <IL> transfer function is as shown below in equation 3. Further, when I_PK is a constant and Gm(PFM) is a predefined value, varying a value of I_SINK varies the V_CTRL to <IL> transfer function of the PFM regulation circuit 110 to facilitate matching with the V_CTRL to <IL> transfer function of the PWM regulation circuit 108 independent of VIN or VOUT. In at least some examples I_SINK is controlled according to the below equation 4 to match the V_CTRL to <IL> transfer function of the PFM regulation circuit 110 to the V_CTRL to <IL> transfer function of the PWM regulation circuit 108. In equation 4, Gmi is a transconductance of an amplifier of the PWM regulation circuit 108 and A is a current loop gain (e.g., as discussed above with respect to the current sense circuit 214 and the comparator 212) associated with the PWM regulation circuit 108. While illustrated and described herein as the current source 408 sinking current from the node 422 through the switch 406 to the ground node 416, in various other examples the current source 408 instead sources current from a supply to the node 422 through the switch 406.

$$K_{VCO} = \frac{Gm(PFM)}{T\_PULSE * I\_SINK} \qquad \text{equation 2}$$

-continued $$\frac{\Delta \langle IL \rangle}{\Delta V\_CTRL} = Gm(PFM)\left(\frac{I_{PK/2}}{I_{SINK}}\right) \quad \text{equation 3}$$

$$Gm(PFM)\left(\frac{I_{PK/2}}{I_{SINK}}\right) = \frac{Gmi}{A} \quad \text{equation 4}$$

The capacitor 404 integrates the current present at the node 422 (e.g., I_VCO when the switch 406 is open or I_VCO minus I_SINK when the switch 406 is closed) to create a voltage V_ERR(PFM) at the node 422. The comparator 410 compares V_ERR(PFM) to VREF3 to generate PULSE, where PULSE is asserted when V_ERR(PFM) is greater than or equal to VREF3 and PULSE is de-asserted when V_ERR(PFM) is less than VREF3. Particularly, when PULSE is asserted and an inductor directly or indirectly controlled to energize or de-energize based on PULSE has a non-zero current, the switch 406 is closed and the capacitor 404 discharges to the node 422. When the inductor returns to zero current, the switch 406 opens and the capacitor 404 is charged until V_ERR(PFM) rises to reach VREF3 and PULSE is again asserted.

As mentioned above, in some examples the circuit 400 includes a switch 424 coupled between the first input terminal of the comparator 410 and the second input terminal of the comparator 410. In some implementations, when PWM is asserted the switch 424 is closed, shorting the first input terminal and the second input terminal of the comparator 410 together. Shorting the first input terminal and the second input terminal of the comparator 410 together, in at least some examples, prevents the node 422 from becoming a floating node. Shorting the first input terminal and the second input terminal of the comparator 410 together further maintains the node 422 at, or near, an operational point for PFM regulation while operating according to PWM regulation to at least partially aid in the seamless transition between PWM and PFM regulation modes, as discussed herein. Further, in at least some implementations a switch 426 is coupled between the output terminal of the amplifier 402 and the node 422, with the switch 426 being controlled based on PFM. In this way, when PFM is asserted and PFM regulation is active (e.g., when <IL> is less than I_PK/2, as discussed above), the switch 426 is closed to enable operation of the circuit 400 and when PFM is de-asserted the switch 426 is open to disable operation of the circuit 400.

Figure 5:
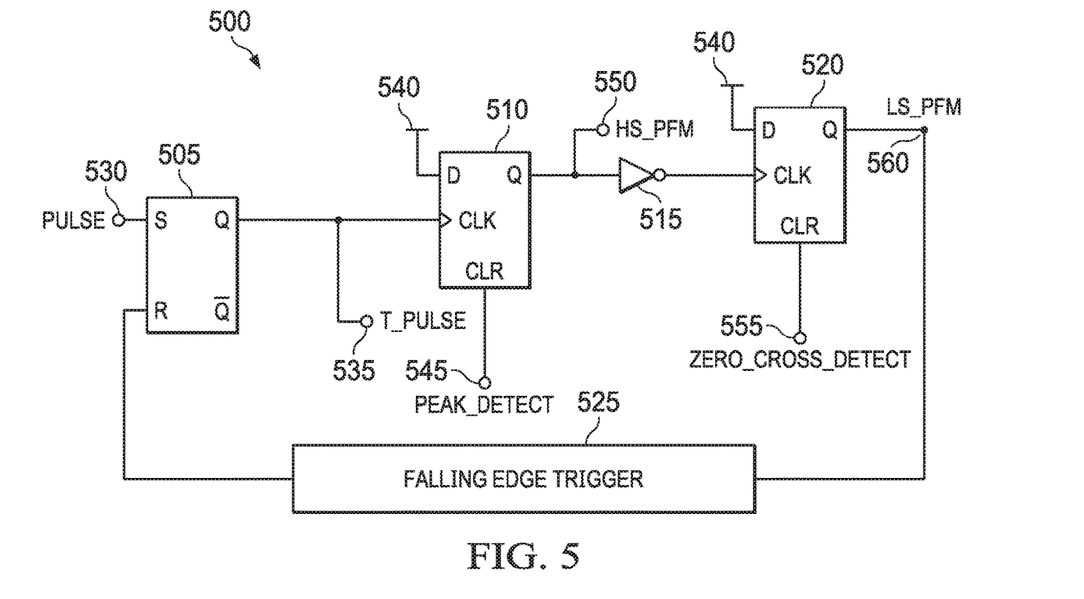
FIG. 5 shows a schematic diagram of an illustrative pulse generation circuit in accordance with various examples.

Turning now to FIG. 5, a schematic diagram of an illustrative pulse generation circuit 500 is shown. In at least some examples, the circuit 500 is suitable for implementation as a pulse generation circuit, such as the pulse generation circuit 218 of the circuit 200 of FIG. 2. In at least some examples, the circuit 500 includes a set-reset (SR) latch 505, a D flip-flop 510, an inverter 515, a D flip-flop 520, and falling edge trigger 525.

In an example architecture of the circuit 500, the SR latch 505 has a set input coupled to a node 530, a reset input coupled to an output of the falling edge trigger 525, and a data output coupled to a node 535. The D flip-flop 510 has a data input coupled to a power source 540, a clock input coupled to the node 535, a clear input coupled to a node 545, and an output coupled to a node 550. The inverter 515 has an input coupled to the node 550 and an output coupled to a clock input of the D flip-flop 520. A data input of the D flip-flop 520 is coupled to the power source 540, a clear input of the D flip-flop 520 is coupled to a node 555, and an output of the D flip-flop 520 is coupled to a node 560. The falling edge trigger 525 is coupled between the node 560 and the reset input of the SR latch 505. In at least one example, the circuit 500 generates and provides HS_PFM at the node 550, generates and provides LS_PFM at the node 560, and generates and provides T_PULSE at the node 535. In some examples, PULSE (e.g., as discussed in reference to the various figures of the present disclosure) is received by the circuit 500 at the node 530, a signal (PEAK_DETECT) representative of a peak current detection is received at the node 545, and a signal representative of a zero crossing detection (ZERO_CROSS_DETECT) is received at the node 555.

In an example of operation, the circuit 500 is configured to generate HS_PFM and LS_PFM according to PULSE. For example, when PULSE is received by the SR latch 505, the SR latch 505 generates a signal that has a logical high value to initiate a PFM pulse. The transition from logical low to logical high of the output of the SR latch 505, in some examples, causes the D flip-flop 510 to output a logical high value to begin the HS_PFM duration. Additionally, in at least some examples the output of the SR latch 505 is further output and/or provided as T_PULSE to indicate the duration of the pulse (e.g., a duration of time until the SR latch 505 is reset, corresponding to a duration of time that HS_PFM or LS_PFM are logical high, or asserted, values). The output signal of the D flip-flop 510 (e.g., HS_PFM) is inverted by the inverter 515 with the inverted version of HS_PFM provided to the D flip-flop 520 clock input. The HS_PFM duration is concluded when PEAK_DETECT clears the D flip-flop 510 when IL has reached IL_PK. In this way, as HS_PFM transitions from logical high to logical low, D flip-flop 520 is clocked to initiate the LS_PFM duration. The LS_PFM duration is concluded when ZERO_CROSS_DETECT clears the D flip-flop 520 when IL has reached approximately zero. The falling edge trigger 525 detects a falling edge in LS_PFM and, based on the falling edge in LS_PFM, resets the SR latch 505 to conclude the PFM pulse, transitioning T_PULSE to a logical low or de-asserted value until a next rising edge of PULSE is received.

Figure 6:
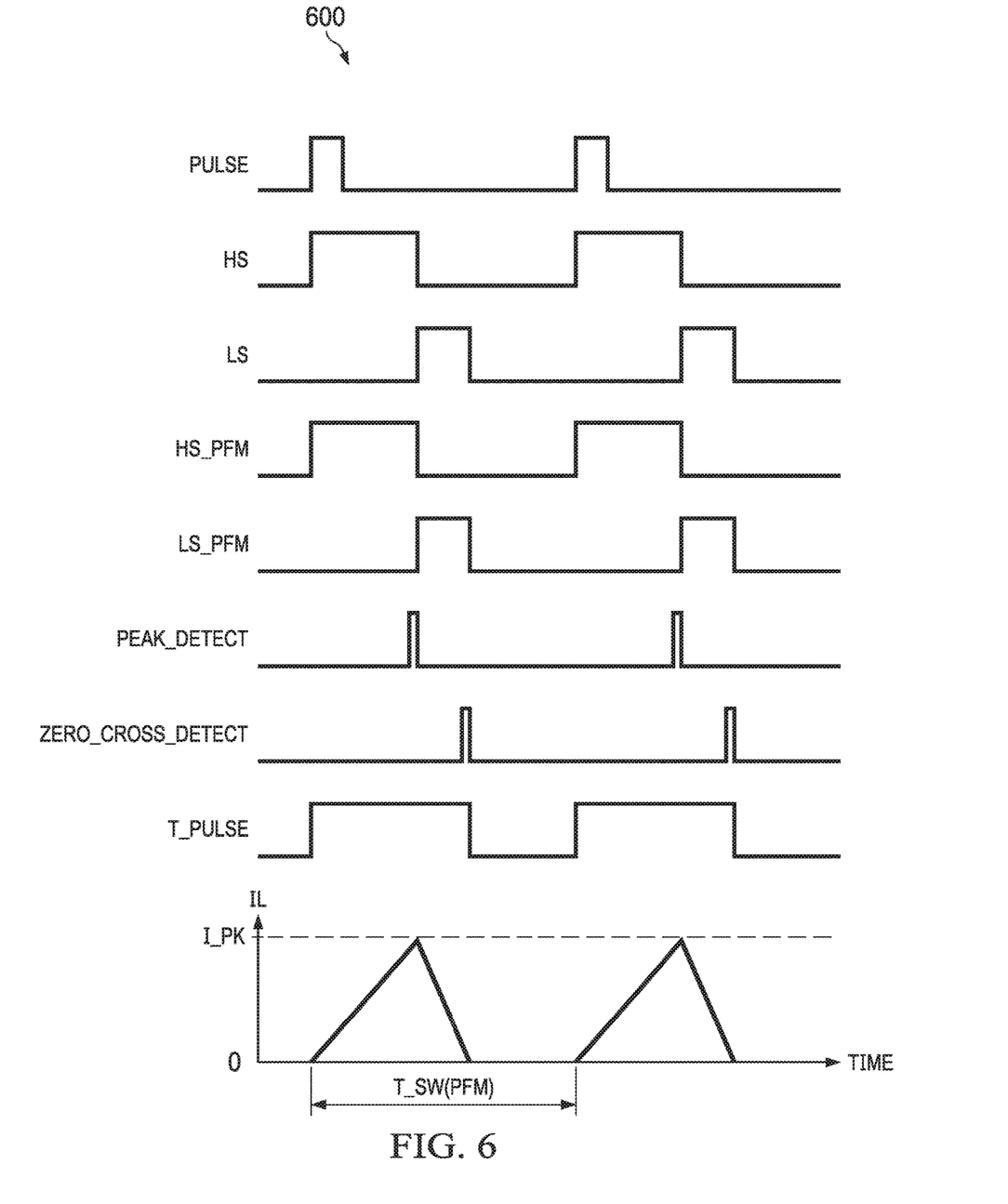
FIG. 6 shows a diagram of illustrative signal waveforms in accordance with various examples.

Turning now to FIG. 6, a diagram 600 of illustrative signal waveforms is shown. In at least some examples, the signals illustrated by the diagram 600 are representative of various signals present in examples of the present disclosure, where signals are labeled in the diagram 600 consistent with the naming conventions used elsewhere in the present disclosure.

As illustrated by the diagram 600, when a rising edge occurs in PULSE, corresponding rising edges are caused in HS_PFM, HS, and T_PULSE, and IL begins increasing in value as an inductor is energized. When IL rises to reach approximately I_PK, a falling edge occurs in HS_PFM and HS at substantially a same time as a rising edge occurring in LS_PFM and LS. Further, when IL rises to reach approximately I_PK, a pulse occurs in PEAK_DETECT. The pulse in PEAK_DETECT may be asserted for any suitable duration, a scope of which is not limited herein. Similarly, when IL falls to reach approximately zero, a falling edge occurs in LS_PFM, LS, and T_PULSE indicating that the period of the IL pulse has ended. Further, when IL falls to reach approximately zero, a pulse occurs in ZERO_CROSS_DETECT. The pulse in ZERO_CROSS_DETECT may be asserted for any suitable duration, a scope of which is not limited herein. While the diagram 600 only illustrates operation with respect to the PFM regulation circuit 110, operation according to PWM operation, such as with respect to the PWM regulation circuit 108, is performed in a customary manner for PWM control of a power converter.

Figure 7:
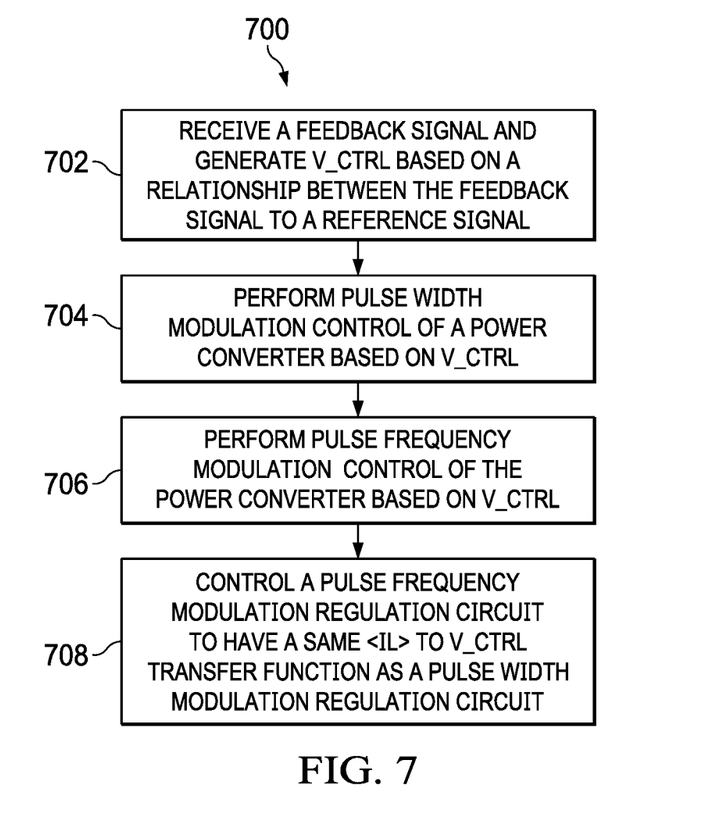
FIG. 7 shows a flowchart of an illustrative method in accordance with various examples.

Turning now to FIG. 7, a flowchart of an illustrative method 700 is shown. In at least some examples, the method 700 is a method of controlling a power converter and corresponds to one or more hardware components, circuits, devices, or systems disclosed herein. For example, at least some portions of the system 100, circuit 200, circuit 400, and/or circuit 500 implement or perform one or more operations of the method 700.

At operation 702, a feedback signal is received and V_CTRL is generated based on a relationship of the feedback signal to a reference signal. The feedback signal is any signal resulting from operation of a power converter. For example, the feedback signal may be VOUT, VIN, a signal representative of IOUT, a signal representative of IIN, a signal representative of IL, a signal representative of a temperature, a signal representative of a load condition, or any other suitable signal on which control of a power converter is based (e.g., a signal used in outer loop control of a power converter). A hardware architecture implemented to generate V_CTRL based on the relationship of the feedback signal to the reference signal is not limited herein.

At operation 704, PWM control of the power converter is performed based on V_CTRL. In at least some examples, PWM control of the power converter is performed when a load supplied by the power converter is heavy (e.g., exceeds a predefined percentage of a maximum output current of the power converter). The PWM control of the power converter is executed, in at least some examples, by a PWM regulation circuit. In at least some examples, the PWM control of the power converter is performed according to CCM operation. A hardware architecture implemented to perform PWM control of the power converter is not limited herein.

At operation 706, PFM control of the power converter is performed based on V_CTRL. In at least some examples, PFM control of the power converter is performed when a load supplied by the power converter is light (e.g., is less than the predefined percentage of the maximum output current of the power converter). The PFM control of the power converter is executed, in at least some examples, by a PFM regulation circuit. The PFM regulation circuit receives V_CTRL, in at least some examples, from a same source as the PWM regulation circuit, for example, such that an input of the PWM regulation circuit that receives V_CTRL and an input of the PFM regulation circuit that receives V_CTRL are coupled together.

At operation 708, the PFM regulation circuit is controlled to have a same V_CTRL to <IL> transfer function as the PWM regulation circuit. By controlling the PFM regulation circuit to have the same V_CTRL to <IL> transfer function as the PWM regulation circuit, a seamless transition between PWM and PFM control is provided and outer loop compensation configured for the PWM regulation circuit also provides for stable operation of the PFM regulation circuit (e.g., preventing the burst-mode operation of the PFM regulation circuit that leads to over-regulation and VOUT ripple at an audible frequency, discussed elsewhere herein). The PFM regulation circuit is controlled to have the same V_CTRL to <IL> transfer function as the PWM regulation circuit by controlling a VCO of the PFM regulation circuit to sink I_SINK to create approximately equal <IL> to V_CTRL transfer functions of the PFM regulation circuit and the PWM regulation circuit, for example, such as discussed above with respect to the circuit 400 of FIG. 4.

While the operations of the method 700 have been discussed and labeled with numerical reference, in various examples the method 700 includes additional operations that are not recited herein. In some examples any one or more of the operations recited herein include one or more sub-operations (e.g., such as intermediary comparisons, logical operations, output selections such as via a multiplexer, etc.). In some examples any one or more of the operations recited herein is omitted. In some examples any one or more of the operations recited herein is performed in an order other than that presented herein (e.g., in a reverse order, substantially simultaneously, overlapping, etc.). Each of these exemplary variations is intended to fall within the scope of the present disclosure.

In the foregoing discussion, the terms "including" and "comprising" are used in an open-ended fashion, and thus should be interpreted to mean "including, but not limited to . . . ." The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A. A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Furthermore, a circuit or device that is said to include certain components may instead be configured to couple to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be configured to couple to at least some of the passive elements and/or the sources to form the described structure either at a time of manufacture or after a time of manufacture, for example, by an end-user and/or a third-party.

While certain components are described herein as being of a particular process technology (e.g., FET, MOSFET, n-type, p-type, etc.), these components may be exchanged for components of other process technologies (e.g., replace FET and/or MOSFET with bi-polar junction transistor (BJT), replace n-type with p-type or vice versa, etc.) and reconfiguring circuits including the replaced components to provide desired functionality at least partially similar to functionality available prior to the component replacement. Components illustrated as resistors, unless otherwise stated, are generally representative of any one or more elements coupled in series and/or parallel to provide an amount of impedance represented by the illustrated resistor. Additionally, uses of the phrase "ground voltage potential" in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, "about", "approximately", or "substantially" preceding a value means +/−10 percent of the stated value.

The above discussion is meant to be illustrative of the principles and various examples of the present disclosure. Numerous variations and modifications will become apparent to those skilled in the art once the above disclosure, is fully appreciated. It is intended that the present disclosure be interpreted to embrace all such variations and modifications.

What is claimed is:

1. A circuit, comprising:
a loop-selection circuit comprising a first amplifier having a first input terminal configured to receive a signal representative of a condition related to a power converter, a second input terminal configured to receive a reference signal, and an output terminal;
a pulse-width modulation (PWM) regulation circuit having an input terminal coupled to the output terminal of the first amplifier, a first output terminal configured to output a first control signal for a high-side transistor of the power converter, and a second output terminal configured to output a first control signal for a low-side transistor of the power converter;
a first current sense circuit having an input adapted to be connected to a terminal of an inductor and having an output connected to the PWM regulation circuit;
a pulse-frequency modulation (PFM) regulation circuit having an input terminal coupled to the output terminal of the first amplifier, a first output terminal configured to output a second control signal for the high-side transistor of the power converter, and a second output terminal configured to output a second control signal for the low-side transistor of the power converter;
a second current sense circuit having an input adapted to be connected to the terminal of the inductor and having an output connected to the PFM regulation circuit; and
a voltage controlled oscillator (VCO) having an input terminal coupled to the output terminal of the loop-selection circuit and an output terminal, the VCO further including:
a second amplifier having a first input terminal coupled to the output of the loop-selection circuit, a second input terminal, and an output terminal coupled to a first node;
a first switch having a first terminal coupled to the first node and a second terminal;
a second switch coupled between the first node and a second node; and
a third switch coupled between the output terminal of the second amplifier and the second node.

2. The circuit of claim 1, wherein the PFM regulation circuit comprises:
a pulse generation circuit having a first input terminal coupled to the output terminal of the VCO, a second input terminal, a third input terminal, a first output terminal coupled to the first output terminal of the PFM regulation circuit, and a second output terminal coupled to the second output terminal of the PFM regulation circuit;
the first current sense circuit configured to receive a first signal representative of an inductor current of the power converter and output a peak current detection signal to the pulse generation circuit when a value of the inductor current of the power converter reaches a peak current value; and
the second current sense circuit configured to receive a second signal representative of the inductor current of the power converter and output a zero crossing detection signal to the pulse generation circuit when the value of the inductor current of the power converter reaches zero.

3. The circuit of claim 2, wherein the VCO comprises:
a capacitor coupled between the first node and a ground node;
a current source having a first terminal coupled to the second terminal of the first switch and a second terminal coupled to the ground node; and
a comparator having a first input terminal coupled to the first node, a second input terminal coupled to the second node, and an output terminal coupled to the first input terminal of the pulse generation circuit.

4. The circuit of claim 3, wherein the second amplifier is a transconductance amplifier.

5. A circuit, comprising:
a loop-selection circuit comprising a first amplifier having a first input terminal configured to receive a signal representative of a condition related to a power converter, a second input terminal configured to receive a reference signal, and an output terminal;
a pulse-width modulation (PWM) regulation circuit having an input terminal coupled to the output terminal of the first amplifier, a first output terminal configured to output a first control signal for a high-side transistor of the power converter, and a second output terminal configured to output a first control signal for a low-side transistor of the power converter;
a first current sense circuit having an input adapted to be connected to a terminal of an inductor and having an output connected to the PWM regulation circuit;
a pulse-frequency modulation (PFM) regulation circuit having an input terminal coupled to the output terminal of the first amplifier, a first output terminal configured to output a second control signal for the high-side transistor of the power converter, and a second output terminal configured to output a second control signal for the low-side transistor of the power converter;
a first switch having a first terminal coupled to the first node and a second terminal;
a current source having a first terminal coupled to the second terminal of the first switch and a second terminal coupled to a ground node; and
wherein the loop-selection circuit is configured to output a voltage control signal, and wherein the current source is configured to sink current from the first node to match a voltage control signal to average inductor current transfer function of the PFM regulation circuit to a voltage control signal to average an inductor current transfer function of the PWM regulation circuit.

6. The circuit of claim 2, wherein the VCO is configured to output a periodic PFM control signal for controlling generation of the second control signal to cause an output of the power converter controlled by the second control signal to include ripple only outside a human-audible frequency spectrum.

7. The circuit of claim 1, wherein compensation in the loop-selection circuit for generating a voltage control signal for controlling the PWM regulation circuit is also used as a same compensation for controlling the PFM regulation circuit.

8. A circuit, comprising:
a pulse-width modulation (PWM) regulation circuit;
a voltage controlled oscillator (VCO) having an input terminal configured to receive a same voltage control signal as the pulse-width modulation (PWM) regulation circuit and having an output terminal;

a pulse generation circuit having a first input terminal coupled to the output terminal of the VCO, a second input terminal, a third input terminal, a first output terminal configured to output a first control signal for a high-side transistor of a power converter, and a second output terminal configured to output a second control signal for a low-side transistor of the power converter;

a first current sense circuit configured to receive a first signal representative of an inductor current of the power converter and output a peak current detection signal to the pulse generation circuit when a value of the inductor current of the power converter reaches a peak current value;

a second current sense circuit having an output directly connected to the pulse generation circuit, the second current sense circuit configured to receive a second signal representative of the inductor current of the power converter and output a zero crossing detection signal to the pulse generation circuit when the value of the inductor current of the power converter reaches zero; and wherein, the VCO further includes:
  a first transconductance amplifier having a first input terminal configured to receive the voltage control signal, a second input terminal, and an output terminal coupled to a first node;
  a first switch having a first terminal coupled to the first node and a second terminal;
  a second switch coupled between the first node and a second node; and
  a third switch coupled between the output terminal of the first transconductance amplifier and the second node.

9. The circuit of claim 8, wherein the VCO comprises:
  a capacitor coupled between the first node and a ground node;
  a current source having a first terminal coupled to the second terminal of the first switch and a second terminal coupled to the ground node; and
  a comparator having a first input terminal coupled to the first node, a second input terminal coupled to the second node, and an output terminal coupled to the first input terminal of the pulse generation circuit.

10. The circuit of claim 9, wherein the VCO is configured to receive the voltage control signal and output a send pulse control signal having a frequency proportional to an average of the inductor current of the power converter, and wherein the send pulse control signal causes the pulse generation circuit to generate at least one of the first control signal or the second control signal.

11. The circuit of claim 10, wherein a transfer function of the voltage control signal to average inductor current of the circuit is equal to the transfer function of the voltage control signal to average inductor current of the PWM regulation circuit.

12. The circuit of claim 11, wherein the transfer function of the circuit is controlled by varying a current conducted by the current source with respect to the first node.

* * * * *